Sept. 10, 1929.  A. M. JACOBS  1,727,982

BUMPER

Filed April 20, 1929

Alfred M Jacobs
INVENTOR

BY Charles A. Clark
ATTORNEY

Patented Sept. 10, 1929.

1,727,982

UNITED STATES PATENT OFFICE.

ALFRED M. JACOBS, OF NEW YORK, N. Y.

BUMPER.

Application filed April 20, 1929. Serial No. 356,714.

My invention relates to bumpers and refers more particularly to automobile bumpers attachable to the front or the rear of automotive vehicles.

One object of my invention is to provide a bumper comprising a rubber tube formed to provide a rigid construction enough to be self supporting and the inner part of the tube filled with a cellular compound.

Another object of my invention is to provide a bumper comprising a rubber tube of substantially D shape in section with its straight part having moulded therein a plate holding a bolting means and directly opposite this plate the tube is thickened to provide sufficient rigidity.

A still further object of my invention is to provide a tube of substantially rigid construction that is adapted to take up severe shocks without deformation.

Another valuable feature of my invention is to provide a tube bumper having its interior filled with a series of air cells communicating with each other and with vents at the end of the bumper.

It is well known in the art that bumpers have been used and that sponge rubber has been used but none of these inventions incorporate the particular construction or arrangement of parts of this device nor have the same organization of elements.

I attain these objects by the means illustrated in the accompanying drawings, wherein similar parts are referred to by like numerals throughout the several views, in which:—

Figure 2:
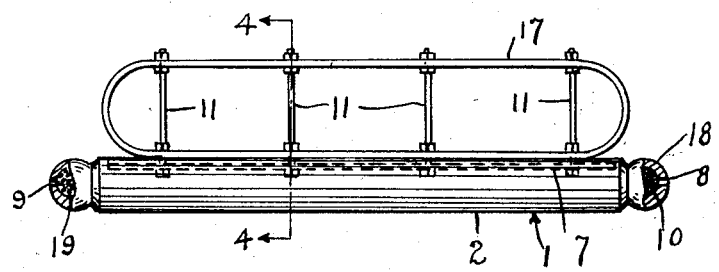
Figure 2 is a plan of a straight bumper adapted to be attached to a motor vehicle.
Figure 4:
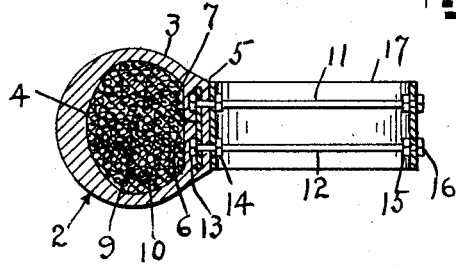
Figure 4 is an enlarged view, in section, taken on lines 4—4 of Figure 2.

Referring to Figure 2, the bumper 1 comprises a tube 2 preferably made of rubber that is substantially D shaped in section, as is clearly shown in Figure 4, wherein the body wall 3 is relatively thin and the D shaped part is thickened up at 4 with the object in view of providing the required stiffness for the tube and this D shaped part has a flat surface at 5 with a relatively thick portion at 6 within which the plate 7 is sealed.

The plate 7 carries a series of bolts like 11 and 12 provided with nuts 13, 14, 15 and 16 for holding the tire or tube 2 to a metallic oval shaped ring 17.

The tube is provided with air or vent holes 8 and 9 at each end and the interior of the tube is filled with material 10 which is formed to provide a large number of individual air cells of a character similar to sponge rubber.

Figure 3:
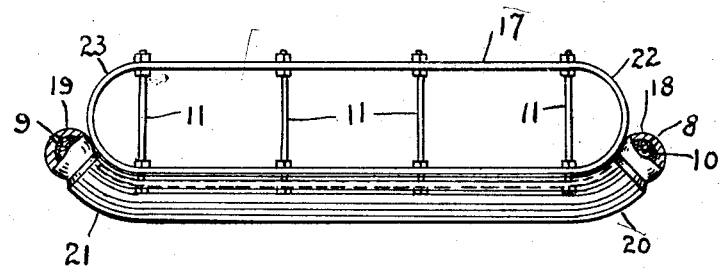
Figure 3 is a plan of a curved bumper.

In Figure 2 a straight tube is shown attached to an oval ring 17 with the rounded ends 18 and 19 projecting straight out and in Figure 3 the tube is formed at 20 and 21 to follow the contour of the rounded ends 22 and 23 of the ring 17.

Figure 1:
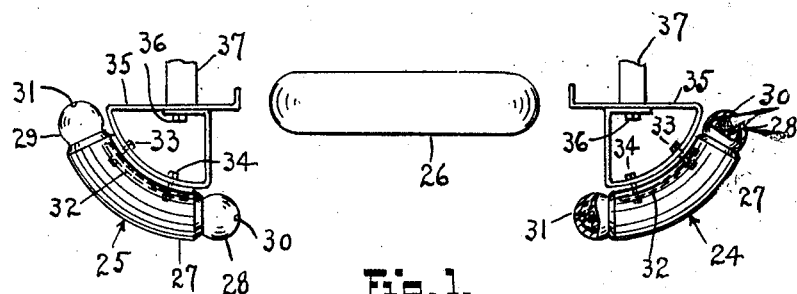
Figure 1 is a plan of the bumperette as attached to an automobile.

The bumperettes 24 and 25, shown in Figure 1 are applied to the back of a vehicle located at each side of the spare tire 26 and are comprised of a curved tube 27 of similar construction to that shown in Figures 2, 3 and 4 only they are much shorter in length.

The rounded ends 28 and 29 are provided with vent holes 30 and 31 and there is a plate 32 imbedded in the part 6 in a similar way as shown in Figure 4 except it is curved and shorter and holds bolts like 33 and 34 which pass through the tire and hold or are held to the segmentally shaped piece 35 by means of the bolts 36 to the parts 37 of the car.

It is obvious that a plurality of these bumpers of either the straight, curved or bumperette type could be used if desired and that the cellular structure inside of the tube would cushion the shock of impact much better that a solid air pocket or in other words a device of this character could be utilized to absorb the shock of impact without the distorting or destruction of the bumper itself.

Having thus illustrated and described the preferred embodiment of my invention, I do not wish to limit myself to the exact construction or arrangement of parts shown, since it is evident that modifications may be made therein without departing from the spirit of the invention or scope of the claims.

I claim:—

1. The combination in a bumper of a rubber tube, D shaped in section having its flat portion and the part opposite thereof relatively thick, said thick flat portion provided with a plate carrying bolts moulded therein and the interior of said tube being filled with a cellular substance with its cells communicating with end vents.

2. The combination in a bumper of a D shaped tube with a thick flat portion and part opposite projecting inwardly, said flat portion having a plate carrying bolts moulded therein, said tube filled with cellular substance and provided with screened vents and an oval loop held by said bolts that is attachable to a motor vehicle.

3. The combination in a bumper of a rubber tube filled with a cellular substance and provided with screened vents, said tube formed to follow the contour of an oval loop held to said tube by means of bolts carried by a plate moulded in said tube.

4. The combination in a bumperette of a curved D shaped rubber tube with vents on the ends, provided with a relatively thick flat portion and a thick portion opposite, said flat portion having moulded therein a plate carrying bolts attachable to a suitably shaped member that may be fixed to a motor vehicle.

Signed at New York, in the county of New York and State of New York this 10th day of April, 1929.

ALFRED M. JACOBS.